United States Patent [19]
Morgan et al.

[11] 3,985,623
[45] Oct. 12, 1976

[54] COLUMN MATERIAL BALANCE CONTROL RESPONSIVE TO DIFFERENTIAL PRESSURE OVER A COLUMN WITHDRAWAL TRAY

[75] Inventors: Barry S. Morgan, Concord; Richard P. Sandell, Orinda, both of Calif.

[73] Assignee: Chevron Research Company, San Francisco, Calif.

[22] Filed: Mar. 7, 1974

[21] Appl. No.: 449,150

[52] U.S. Cl. .............................. 196/132; 73/215; 202/160; 203/1; 203/3; 203/DIG. 18; 208/DIG. 1; 235/151.12; 261/114 R
[51] Int. Cl.² .................... B01D 3/42; C10G 7/02
[58] Field of Search ........... 208/DIG. 1, 385; 203/1, 203/3, DIG. 18; 196/132, 133; 235/151.12; 202/160; 261/114 R; 73/215, 216

[56] References Cited
UNITED STATES PATENTS

| | | | |
|---|---|---|---|
| 1,992,720 | 2/1935 | Skeats | 73/215 |
| 3,053,521 | 9/1962 | Plaster et al. | 73/215 |
| 3,136,706 | 6/1964 | Harper | 196/132 |
| 3,700,566 | 10/1972 | Bellinger et al. | 203/DIG. 18 |

*Primary Examiner*—Frank W. Lutter
*Assistant Examiner*—Frank Sever
*Attorney, Agent, or Firm*—R. L. Freeland, Jr.; H. D. Messner

[57] ABSTRACT

Overflash within a withdrawal zone of a complex fractionating column is monitored to provide a control characteristic related to the efficiency of the fractionation column, and associated processes linked to the column. To accurately monitor the overflash, notched weir means including an upright wall means, is positioned at the intersection of the withdrawal tray and the downcomers connecting the former with a lower, adjacent fractionating tray. Differential pressure measuring means is also provided with sensing means in the vicinity of the notched weir means. The differential pressure measuring means produces a signal characteristic of said overflash. A complex controller means, external of the column, generates correction operators in response to said signal. Respective control means regulate column feed and withdrawal streams in response to said correction operators and thus maintain a pre-selected material balance within the column.

7 Claims, 7 Drawing Figures

COLUMN MATERIAL BALANCE CONTROL RESPONSIVE TO DIFFERENTIAL PRESSURE OVER A COLUMN WITHDRAWAL TRAY

FIELD OF THE INVENTION

The present invention relates to an apparatus and method for monitoring liquid condensate flow within a complex fractionation processing system, and more particularly to a method and means which utilizes the flow rate of excess overflash within a complex fractionation process as a control characteristic of not only the fractionation column itself but also of associated processes linked to the column. In this application, the terms "complex distillation column" and "complex fractionation column" refer to a column that has one or more feeds and/or one or more withdrawal streams in addition to conventional distillate and bottom products. See *Encyclopedia of Chemical Technology*, 2nd Ed., Vol. 7, p. 231.

BACKGROUND OF THE INVENTION

Today's petroleum refinery processes include many complex operations, one or more of which may require controlled regulation of process streams as a function of measured system parameters. For example, in a complex hydrocarbon flash distillation process, an intermediate liquid side steam drawn from liquid condensate within a complex distillation column at, say a withdraw zone, may be used for a multiplicity of purposes, inter alia, (i) to produce subsequent jet fuel product in a downsteam liquid-vapor stripping process, (ii) to control flow, and hence, efficiency in side stream gas recovery columns, reboilers, and the like, and (iii) to control intermediate recycle circulation of the distillation column itself. Remaining excess liquid condensate within the column, called overflash, is free to cascade down to lower fractionation trays of the column located below the withdrawal zone. In providing items (i)-(iii), above, the flow rate of the side stream exiting from the column has been found to be a valuable parameter for control purposes. However, experience also has shown that if the established withdraw rate becomes unbalanced vis-a-vis the flow rate of the overflash at the withdrawal zone, there can be upsets in the associated processes linked to the withdrawal line as well as a reduction in fractionation efficiency within the distillation column itself. See Shinskey, F. G., "The Value of Process Control" *Oil and Gas Journal*, Feb. 18, 1974 and articles cited therein.

While instrumentation for measuring process parameters in the external piping is feasible, response time for such equipment is often inadequate to properly control the complex processing system, at least in the situation where deviation from selected setpoint limits occurs at a rather rapid rate.

OBJECT OF THE INVENTION

An object of the invention is the provision of a novel system for controlling a complex fractionation system by which a surprisingly useful control characteristic associated with internal overflash flow in the withdrawal zone of a complex distillation column can be easily generated. Once deviation from acceptable setpoint limits is detected, the overflash control operator aids in reestablishing acceptable processing control parameters within the system.

SUMMARY OF THE INVENTION

In accordance with the present invention, conventional control parameters within a complex fractionation system can be augmented to a surprising degree through the generation of an overflash flow parameter within the withdrawal zone of the fractionation column. Such a control parameter is generated by an overflash metering means comprising a notched weir means including upright wall means, positioned, say at the intersection of the withdrawal tray with downcomer means connecting the former with a lower, adjacent fractionation tray. The function of the notched weir means: to obstruct and then aid in measuring, continuously, the rate of flow of liquid overflash from the withdrawal tray to the adjacent fractionating tray via the weir means using differential pressure measuring means provided with sensing means in the vicinity of the upright wall means. In turn, the differential pressure measuring means is connected in series to a recording means positioned external of the column.

In accordance with more detailed apparatus aspects of the present invention, the notched weir means preferably includes frame means forming a central opening which can be placed in fluid alignment with the downcomers attached to the withdrawal tray. The height of the frame means above the withdrawal tray can vary as a function of circumference along the wall means, so as to form a series of uniformly spaced notches at the upper edge of the wall means. In that way, overflash released through the notches and downcomers to the next adjacent fractionating tray, can be measured as a function of the liquid head above the withdrawal tray floor in the vicinity of the frame means, such characteristic being accurately indicative of overflash flow even though a portion of the liquid condensate is simultaneously withdrawn at the withdrawal tray via side stream pump means in liquid contact with the sump of the withdrawal tray.

In accordance with detailed method aspects of the present invention, the downwardly cascading overflash from the withdrawal tray to the adjacent fractionating tray provides a valuable processing control parameter when used in association with a complex fractionating processing system, that parameter being useful in controlling not only the flash distillation process interior of the column but in controlling exterior processes as well. In this regard, the liquid head above the weir means within the withdrawal zone has been found to be directly proportional to the flow of the overflash through the notched weir means and downcomers to the adjacent fractionating tray. Measurement of the liquid head is carried out by differential pressure measuring means including sensor means located at the intersection of the withdrawal tray and the downcomers. The latter generates a signal indicative of head, that signal being recorded by recorder means external of the column. Result: Overlimit trends related to the rate of flow of the downwardly cascading overflash, can be noted. And corrective action, as required, can then be initiated to stabilize system operations.

FURTHER OBJECTS OF THE INVENTION

Further objects and features of the present invention will become readily apparent to those skilled in the art from the following description of a preferred embodiment thereof, in which:

DETAILED DESCRIPTION OF A SPECIFIC EMBODIMENT OF THE INVENTION

Figure 1:
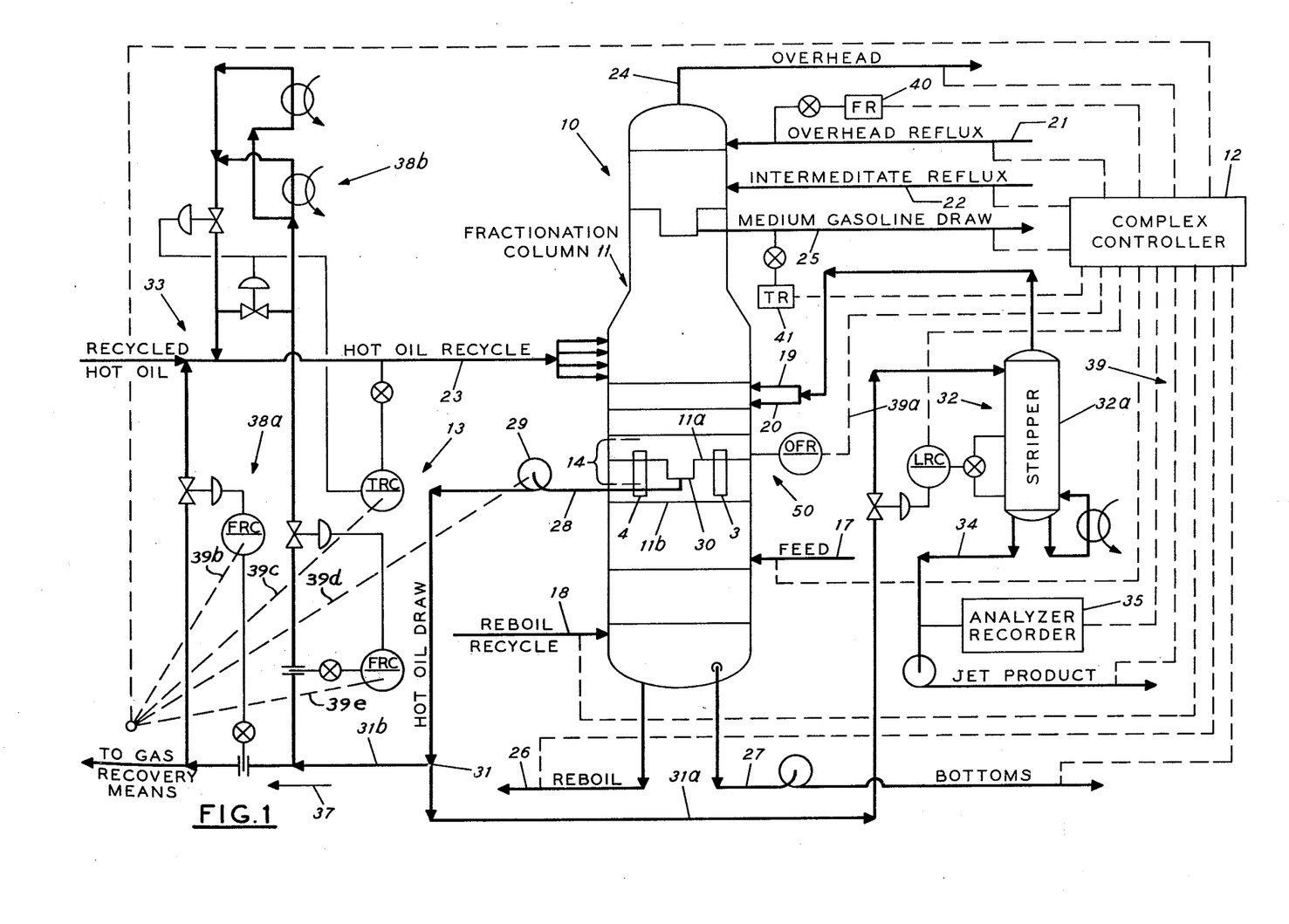
FIG. 1 is a schematic diagram of a complex fractionation processing system utilizing an overflash measuring means of the present invention.

Reference should now be had to the Figures, with particular reference to complex fractionation system 10 of FIG. 1. As shown, complex fractionation system 10 includes a complex distillation column 11. A complex controllor means 12 operatively connects to column 11, and includes a separate regulation means 13 associated with control of withdrawal zone 14 of the column 11. Purpose of the controller 12 and regulation means 13: to optimize and stabilize process variables within the fractionating system 10 as a function of a various process parameters as explained in detail below:

In describing the operation of distillation column 11, consider the flow of feed, recycle, intermediate, and product streams at various inlet and outlet lines of the column 11, e.g., i. Feed and recycle streams are seen in FIG. 1 to be associated with the lines 17–23 described as shown, while ii. intermediate and products steams are seen to exit from the column 11 at overhead line 24, at medium gasoline draw line 25, at reboiler outlet 26, at bottoms line 27 as well as at side stream draw line 28.

As to flow in line 28, note the usage of a positive flow pump 29 adjacent to the connection of the line 28 to sump 30 of the withdrawal zone 14 as well as the employment of a T-junction 31 at the discharge side of the pump 29 which provide hot oil draw flows in two parallel lines: junction line 31a carries the hot oil draw to vapor-liquid stripping system 32, and associated line 31b carries a parallel stream to hot oil circulation system 33. Stripper 32a of the stripping system 32 provides a bottoms stream which becomes jet product via line 34 and passes through a recorder analyzer 35.

Circulation system 33 performs two separate functions:

i. aids in the recovery of gas in the associated gas stream process connected to line 31b in the direction of arrow 37; and ii. controls the cooling by steam generation of the recycled hot oil draw stream within the secondary circulation networks 38a and 38b under control of regulation means 13. As a result, the recycled oil reentering the column 11 via line 23 can, under normal process conditions, be kept within acceptable process temperature setpoint limits.

However, experience shows that even with the use of complex control equipment, such as controller linkages 39 connected to controller means 12, the fractionation system 10 of FIG. 1 can still become unbalanced. For example, if the withdrawal flow rate of hot oil via line 28 is too high (or too low), fractionation efficiency within the column 11 can suffer before corrective operations can be initiated. Likewise, there can be concomitant loss in efficiency within the processes linked to the column 11, i.e., within liquid-vapor stripping system 32 and within circulation system 33.

In accordance with the present invention, process control parameters associated with conventional complex fractionation system 10 of FIG. 1 can be enhanced to a surprising degree by the generation and interpretation of an overflash flow parameter related to excess overflash flow occurring at the withdrawal zone 14 of the fractionation column 11. Such a control parameter can be accurately generated by an overflash measuring means 50 operationally attached to the column 11 as shown in FIG. 1. Briefly, the overflash measuring means 50 of the present invention provides a series of signals. These signals indicate the rate of flow of overflash from the withdrawal tray 11a to the adjacent lower fractionating tray 11b via downcomers 3 and 4. The signals can then be recorded as a function of time to form histograms which can then be interpretated and corrective action taken, as by human intervention, or the signals can be passed directly to the complex controller means 12, via complex linkage 39a, to effect direct changes in associated operating variables, say via selected sets of linkages 39 connected from the controller 12 to various system control and regulation means, e.g., via linkages 39b39e of regulation means 13.

Figure 2:
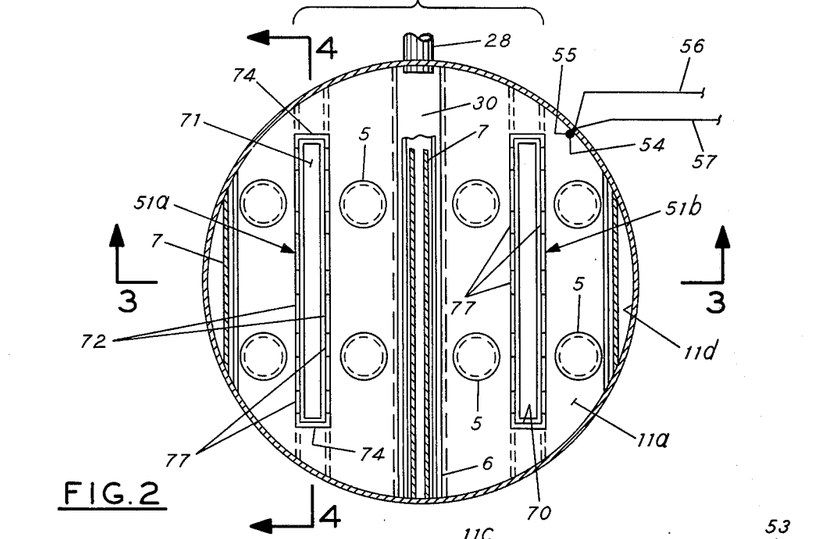
FIG. 2 is a top elevation of a complex distillation comumn of the system of FIG. 1 illustrating constructional features of the overflash measuring means of the present invention.
Figure 3:
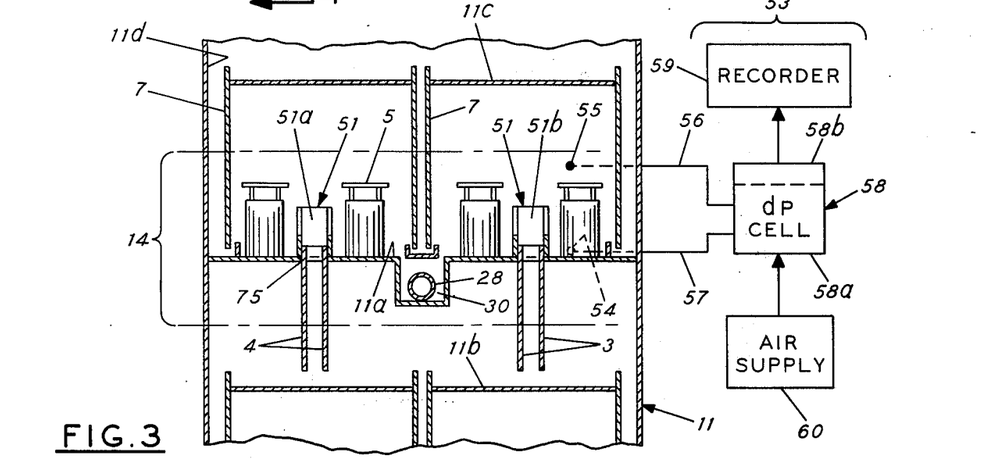
FIG. 3 is a section taken along line 3—3 of FIG. 2.
Figure 4:
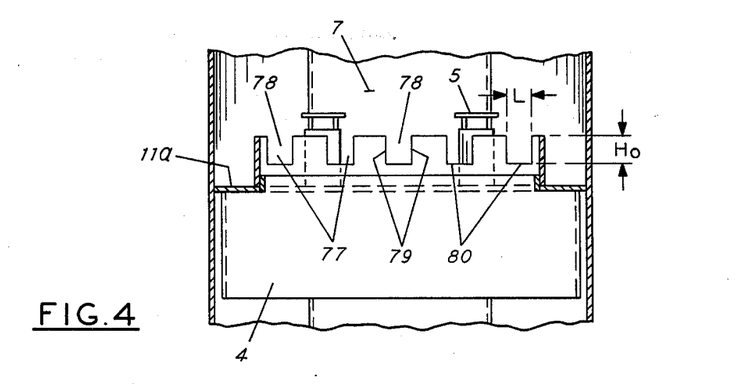
FIG. 4 is a section taken along line 4—4 of FIG. 2.

FIGS. 2, 3 and 4 illustrate, in more detail, overflash measuring means 50 of the present invention.

As shown in FIG. 3, fractionation in column 11 occurs at fractionation trays 11b and 11c adjacent to withdrawal tray 11a. Vapor traffic from the fractionation tray 11b passes upward through the withdrawal tray 11a via chimneys to the fractionating tray 11c. Of course, the liquid traffic is countercurrent to the vapor flow. It passes downwardly from the fractionation tray 11c to the withdrawal tray 11a via series of downcomers 7 fitted at the first-mentioned tray as shown in FIG. 3. Since the withdrawal tray 11a is solidly fastened as by welding to the sidewall 11d of the column 11, liquid that is not withdrawn via sump 30 through line 28, must pass by the downcomers 3 and 4 to the fractionating tray 11b. Such flow only occurs if the depth of back-up liquid is sufficient to clear notched weir means 51 of overflash means 50 aligned with the downcomers 3 and 4 at the intersection of the latter with the withdrawal tray 11a. A differential pressure measuring means generally indicated at 53 is also provided in the vicinity of notched weir means 51. Its function: to translate differential pressures due to the liquid head at the notched weir means 51 into pneumatic signals. For this purpose, it includes sensors 54 and 55 internally attached interior of the column 11 at preselected positions, each sensor including nozzle means (not shown) via piping 56, 57, extending from the interior of the column 11 to its exterior for attachment to differential pressure measuring cell means 58 connected in shunt between recording means 59 and air supply 60.

The overflash measuring 50 combines already-existing constructional features of the withdrawal tray 11a with new operating elements in order to provide an overflash flow control characteristic associated with the withdrawal zone 14. In order to better appreciate the present invention, a brief discussion of the constructional feature of the withdrawal tray 11a is in order.

Note in FIG. 2 that the withdrawal tray 11a contains no sieve holes over its central region. Thus, in order to allow upward vapor traffic therethrough, a series of openings is provided through which the vapor chimneys 5 extend. A recessed channel member 6 of rectangular cross-section is also provided over the central region of the withdrawal tray 11a, the channel member 6 forming the sump 30 of the withdrawal zone 14, as previously mentioned. At the remote termination of the member 6 is outlet line 28, the line 28 connecting to exterior processing networks through pump means in the manner shown in FIG. 1.

Differential pressure measuring means 58 is only functionally illustrated in FIG. 3 since it is readily available from several commercial sources. Briefly, in one embodiment, a pair of flexible diaphragms (not shown) is used as a sensing element. These diaphragms are welded to opposite sides of a rigid steel disc to form a force balance principle of operation of a differential cell 58a which allows for measurement of differential pressures in the range between 0–5 and 0–25 inches of water differential at the withdrawal tray 11a. The output pneumatic signal is generated by a pneumatic translation means generally indicated at 58b. The generated signal proportional to differential pressure at the tray 11b, say in a range of 3–15 psi, is then transmitted to a recording means 59. At the recording means 59 there is generated a histogram of signal amplitude versus time calibrated as explained below into flow information of the overflash interior of the column.

In FIGS. 2 and 3 note the position of the sensors 54 and 55 of the differential pressure measuring means 53.

In FIG. 3, sensor 54 is located near the bottom of tray 11a while terminal sensor 55 is located well above the tray 11a in the vapor zone, thus avoiding being submerged within the backup liquid in the vicinity of the downcomers 3 and 4. In FIG. 2, also consider that the terminal sensors 54 and 55 are vertically aligned in a common plane. Hence, the resulting indications of differential pressure are assured of accurately measuring liquid head at the rectangular notched weir means 51 over a range of overflash flow rates conventional in flash distillation processes without the introduction of variable turbulence or end effects which could, if uncorrected, distort such measurements.

FIGS. 2, 3 and 4 illustrate retangular notched weir means 51 in further detail.

Since the functioning of the notched weir means 51 is the sum of the effects of its left- and right-handed elements 51a and 51b, as viewed in FIG. 2, and, furthermore, since the operation of each element 51a and 51b is identical one to the other, only the left-handed weir element 51a will be described in detail below.

As shown in FIG. 2, the notched weir element 51a is seen to include a frame means 70 defining an opening 71 having an axis of symmetry 72 aligned with that of the adjacent downcomer 4. Frame means 70 also is seen to include a pair of parallel sidewalls 72 and much shorter cross-connected end-walls 74. Each wall has a rectangular cross-section and is attached at its bottom edge 75 to the tray 11a, as by welding. The ratio of the lengths of the side and end walls are dictated, of course, by the channel size of the downcomers 3 and 4 although variations in construction can be implemented where required. In this regard, note that in FIG. 2 the notched weir means 51 is not positioned adjacent to the sidewall 11d of the column 11, but is more centrally mounted near the axis of symmetry of the latter. Thus, turbulence and variations due to end effects would be expected to be a problem; however, surprisingly, experience has shown that the flow information provided by the wier means 51, at least in the range of useful liquid flow traffic rates common to column 11, is highly accurate.

Since downcomers 3 and 4 have longer length dimensions than end dimensions, only the parallel sidewalls 72 of the notched weir means 51 are provided —at the upper edges—with a series of uniformly spaced rectangular notches 77 (FIG. 2).

FIG. 4 illustrates notches 77 in more detail.

As shown, each notch 77 provides a rectangular notched opening 78. Opening 78 is defined by parallel sidewalls 79 and terminating end-wall 80 and is spaced a uniform distance from its neighbor. The number and sizes of the notches 77 per sidewall 72 can vary, of course, depending upon operating parameters within the column 11, and, moreover, depend to a great extent on the set point flow range of the overflash required for proper functioning of the column and its associated processes. In this regard, where $H_o$ is the incremental height of the sidewall 79 and L is the wideth of end-wall 80, the following equation for volumetric flow has been found to be of value in determining an acceptable flow range:

$$Q = 0.386 L \cdot H_o^{1.5} \sqrt{2g}$$

Source: *Chemical Engineers' Handbook*, Perry, 4th Ed.

While a uniform series of rectangular notches 77 along each sidewall 72 appears to provide better linear response characteristics in operation, it should be apparent that other types of notched weirs could also be used. In this regard, a vee notched weir means has been contemplated as have other types of sharp-crested notched weir means such as found in "*Elementary Fluid mechanics*," J. K. Vennard, 3rd Ed., at pages 312 et seq. Also of some value may be broadcrested notched weirs. However, since the latter are more costly to manufacture and take more time to assemble, their probability of usage is somewhat lower than sharp-crested weirs.

Figure 5:
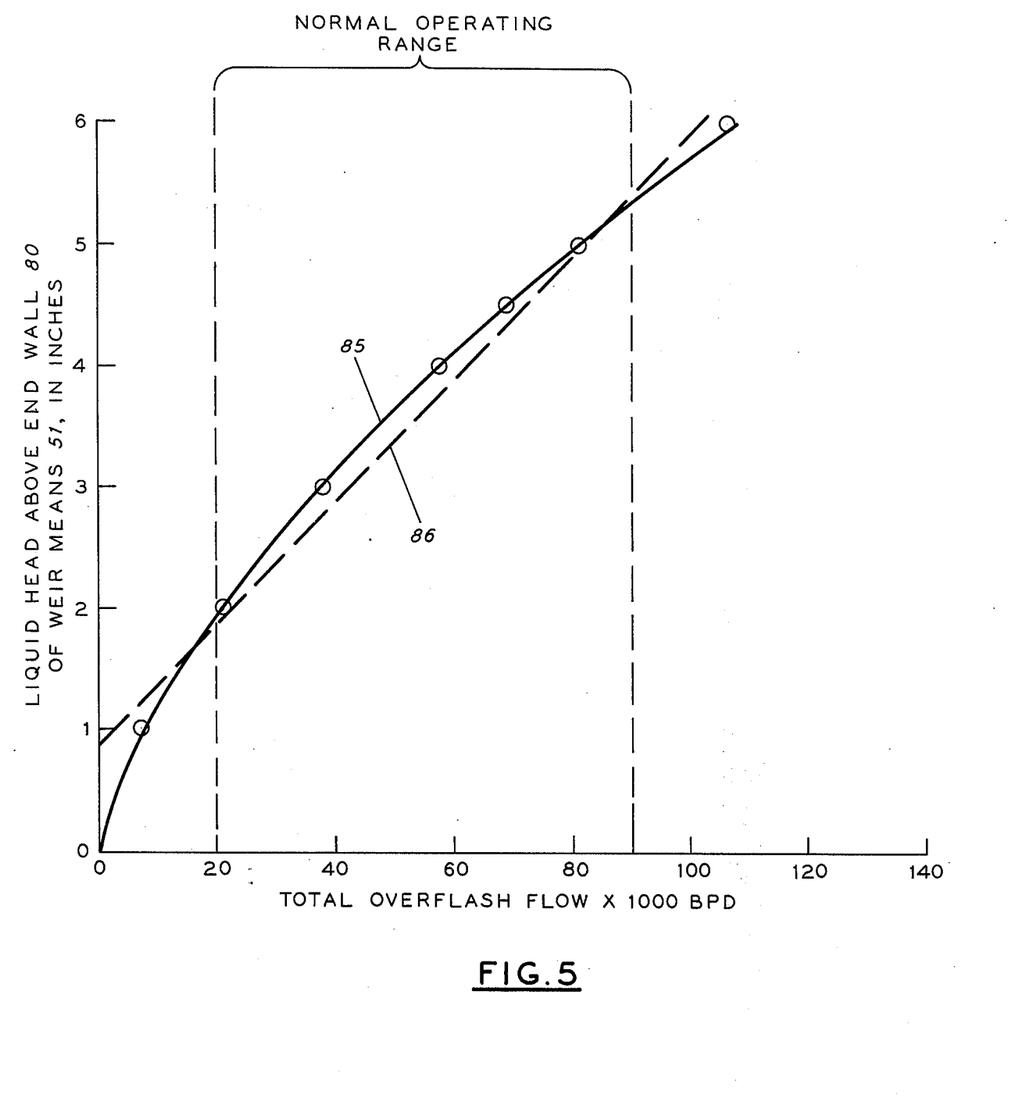
FIG. 5 is a response curve of the overflash measuring means of FIGS. 2–5.

FIG. 5 illustrates an actual response curve 85 generated by overflash metering means 50 of the present invention.

Note that curve 85 is nearly linear over a selected overflash operational flow range, i.e., curve 85 deviates only slightly from theoretical linear response curve 86 shown in phantom line over at an overflash flow range of 20,000 BPD-90,000 BPD. Such response characteristics seem to be due, at least in part, to the improved back-up depth of the liquid condensate within the withdrawal zone as provided by the notches 77; such depth seems to provide a sufficient reservoir of liquid to allow successful implementation of changes within various control parameters of the system to maintain high quality fractionation within the columns 11 as well as good withdrawal product quality within the associated processes. However, as operational requirements change, it may be necessary to restructure the number or sizes of the notches 77 to accommodate changed process conditions.

In constructing the curve 85, assume that a set of rectangular notches, each of which defines an opening equal to 2 × 6 inches, was used. Accordingly, for changed notch dimensions, any resulting response curve would be shifted in proportional manner to the changed parameters over those associated with curve 85 of FIG. 5.

Experience has shown that in a complex fractionation system of the type illustrated in FIG. 1, the overflash metering means 50 of the present invention, having the following dimensions and specifications, can provide surprisingly useful sets of control parameters.

Overflash metering means 50
Rectangular notched weir means 51a
Frame means 70
   All over dimensions, 15 feet × 1 foot
   Height of side and end walls 72, 74: 10 inches
   Rectangular notch 77
   Dimensions: 2 inches × 6 inches
   Number: 10
Differential pressure means 53
Pressure differential ranges 0-5 and
0-25 inches of water; static pressures max. 500 psi,
   Output signal: 3-15 psi.
   Manufacturer: Foxboro Corporation
   Model 15
Air Supply 60
   Pressure Rating: 20 psi
Flow Recorder 59
   Type: Pneumatic

EXAMPLE I

Figure 6:
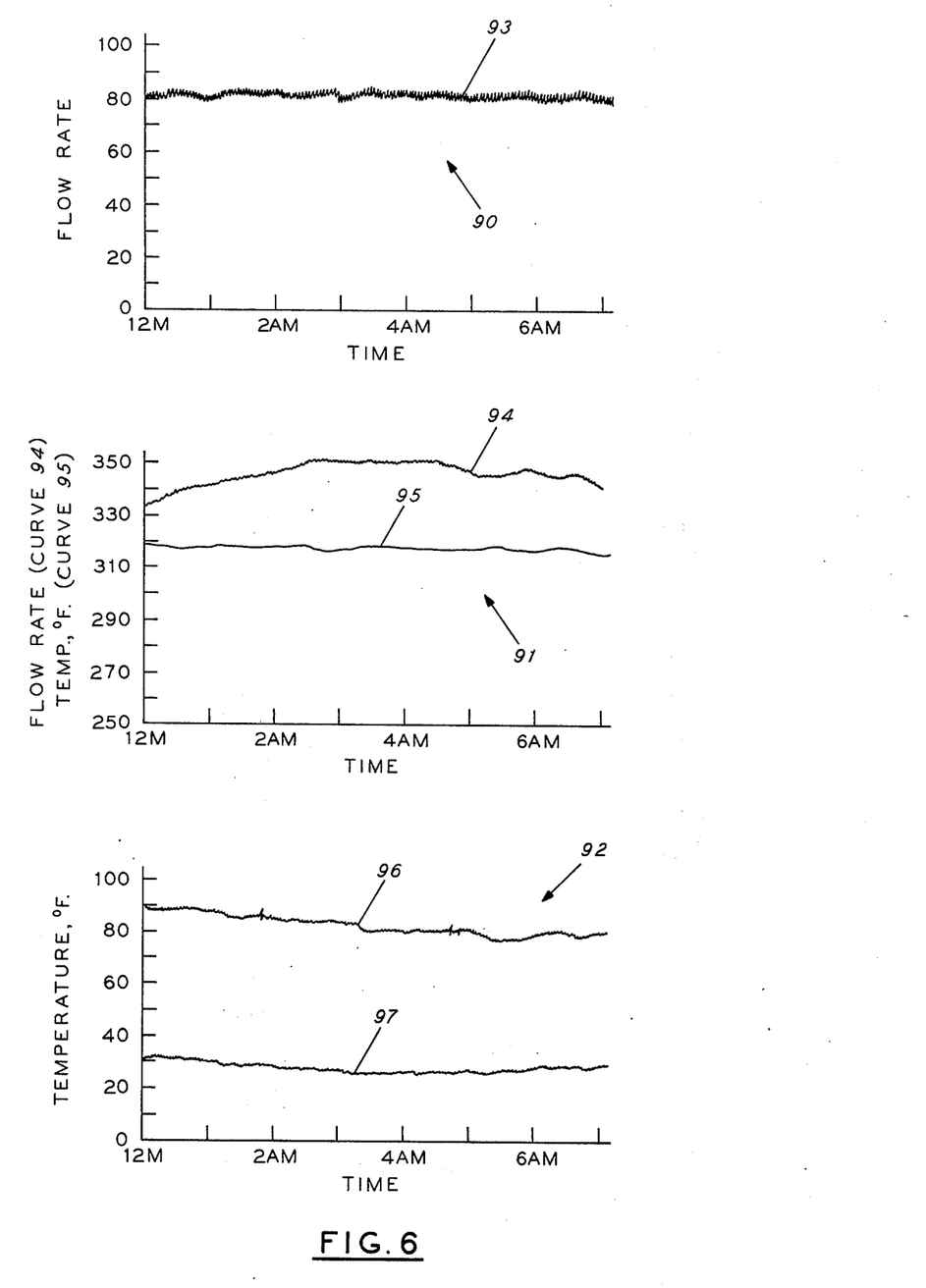
FIGS. 6 and 7 are an ensemble of histograms illustrating the usefulness of the overflash measuring means of the present invention.

FIG. 6 is an ensemble of histograms 90, 91 and 92 generated by various system recorded controllers within a complex fractionation system of the type illustrated in FIG. 1.

The geneses of the histograms 90, 91 and 92 were as follows: Histogram 90 was generated by the overflash measuring means 50 of FIGS. 1-4; histogram 91 was produced by records 40 and 41 of FIG. 1; and histogram 92 was provided by analyzer recorder 35 of FIG. 1.

With specific reference to histogram 90, note a linear steady output curve 93 has been generated at about 80% full overflash flow; i.e., at about 68,000 BPD of overflash for a 7-hour time period. Likewise, in histograms 91 and 92 for the same time period, there are indications that the fractionation system has generated high quality distillates and side-stream products.

For example, reflux overhead flow rate 94 in histogram 91 (which is controlled by the mid-gasoline draw temperature curve 95) is seen to be at a high value, i.e., it shows an overhead reflux rate of about 27,000 BOD's at a medium gasoline average draw temperature of about 320°F. Similarly, the 10% and 90% distillation product curves 96 and 97 of histogram 92 are also well within operating setpoint limits. That is, the curves 96 and 97 are between 300°-400°F and 400°-500°F, the setpoint temperature ranges; say at about 385°F (curve 96) and 428°F (curve 97), respectively.

EXAMPLE II

Figure 7:
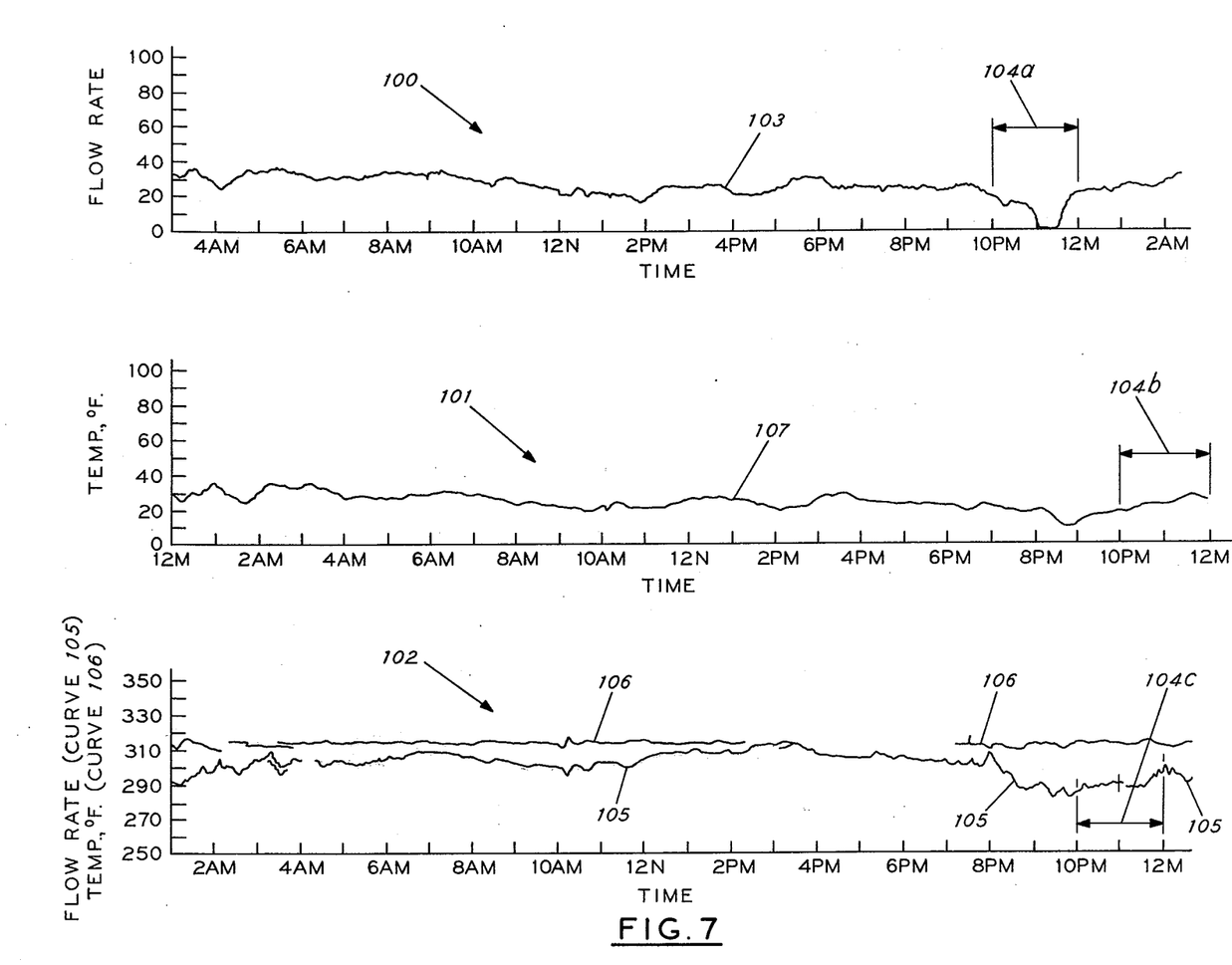

FIG. 7 illustrates a second set of histograms 100, 101 and 102 for a 24-hour period in which process upsets occur as predicted by the overflash metering means of the present invention.

In more detail in FIG. 7, the histogram 100 for the overflash measuring means of the present invention indicates a curve 103 that shows, for a majority of the represented time period, a rather low rate of flow of overflash even though within acceptable setpoint limits, i.e., about 22,000 BPD. However, at region 104a of the curve 103, the flow rate as indicated by overflash meter means falls below acceptable limits, i.e., from about 17,000 BPD to zero.

Indications of system inefficiency are also shown in histograms 101 and 102. For example, in histogram 102, reflux overhead rate 105 is unsteady for similar time periods and seems to reach a low rate at approximately 10,500 BPD in the region 104c aligned in time with region 104a of histogram 90, although the medium gasoline draw temperature curve 106 seems to be within specification limits, i.e., at an average temperature of 310°F where the setpoint range is about 250°-350°F. Jet product curve 107 (10%) of histogram 101 also is seen to be on the low side of, but within, the setpoint temperature range of 300°-400°F, particularly in the region 104b aligned in time with the regions 104 and 104c of the histograms 100 and 103 respectively.

When an overflash flow rate as indicated by the histogram 100 was restored within acceptable setpoint limits, say be reduced withdrawal of the liquid condensate from sump 30 of withdrawal tray 11a via pump means 29 in line 28 (FIG. 1), the system returned to efficient operations.

While specified preferred embodiments of the present invention have been hereinbefore described, it should be understood that the invention is not limited thereto as many variations will be readily apparent to those skilled in the art and thus the invention is to be given the broadest possible interpretation within the terms of the following claims.

We claim:

1. In a fractionation process system having a fractionation column including inlet means for introducing one feed stream to said column, outlet means for withdrawing at least one stream from said column in addition to conventional distillate and bottom product streams, control means for optimizing and stabilizing process variable within preselected setpoint limits including exterior processes associated with said fractionation column, comprising in combination,   A. metering means operative at said withdrawal zone of said column between a withdrawal tray and an adjacent fractionation tray interconnected by downcomer means whereby, in operation, liquid flow cascading, by gravity, from said withdrawal tray to said adjacent fractionation tray via said downcomer means, can be accurately measured as a function of time, said metering means comprising:

i. weir means including frame means mounted in alignment with said downcomer means at an intersection with said withdrawal tray, said frame means including upright wall means for providing an obstruction to flow of cascading liquid from said withdrawal tray to said adjacent fractionating tray via said downcomer means, said upright wall means also having a series of notches spaced along an upper edge thereof remote from said withdrawal tray whereby the rate of flow of said cascading liquid through said notches can be calibrated in terms of liquid head above said withdrawal tray adjacent to said upright wall means to provide, in toto, a range of measurable liquid flow rates associated with efficient operations of said column, ii. differential pressure measuring means including sensor means for measuring said liquid head above said withdrawal tray adjacent to said upright wall means as a function of differential pressure, said differential pressure measuring means producing a signal proportional thereto, iii. means for indicating said signal so that when deviations from cascading liquid flow rate setpoint limits occur, correction operators can be quickly generated by a complex controller so as to reestablish optimal and stable processing conditions within sid fractionation system, B. Respective control means connected to said inlet and outlet means of said fractionating column for controlling flow of said one stream introduced into said column and said at least one stream withdrawn from said column, responsive to said correction operators; at least one of said respective control means including separate sensing means adapted to sense conditions of one of said at least one stream, which is withdrawn from an intermediate withdrawal zone of said column.

2. The system of claim 1 wherein:

1. said fractionation process system comprises a hydrocarbon flash distillation process wherein said withdrawal stream at said withdrawal zone of said fractionating column is a heavy oil draw stream, 2. said system further comprising a liquid-vapor phase stripping means connected to the downstream side of said withdrawal zone for separating components of said heavy oil draw stream into a jet fuel product, 3. said processing system still further comprising a hot oil circulation system connected in parallel to said liquid-vapor phase stripping means also downstream of said column.

4. said separate conditions sensing means controlling withdrawal of said heavy oil draw stream, also being further characterized by a flow regulation means downstream of said column operatively connected to said metering means.

3. The system of claim 1 in which said series of notches along the upper edge of said upright wall means are uniformly spaced from notch to adjacent notch and each defines a rectangular opening of predetermined dimensions so as to provide, in toto, a range of measurable flow rate that provide for efficient operation of said fractionation column.

4. The system of claim 1 in which said series of notches along the upper edge of said upright wall means are uniformly spaced from notch to notch and each defines a vee-shaped opening of predetermined dimensions so as to provide, in toto, a range of measurable flow rates that provide for efficient operation of said fractionation column.

5. The system of claim 1 in which said withdrawal tray includes a plate member having a circumferential edge fixedly mounted to a side wall of said fractionation column, said plate member also having a first series of openings through which vapor chimneys extend above said plate member so as to allow vapor to flow therethrough and a second set of openings connected to said downcomer means so as to limit liquid flow through said downcomer means only.

6. The system of claim 1 in which said correction operators are generated at and controlled by said separate condition sensing means associated with said withdrawal of said one stream at said withdrawal zone of said fractionating column.

7. The system of claim 6 in which said control operators control the withdrawal flow rate of said one stream at said withdrawal zone within preselected limits so as to maintain a material balance within said column, including liquid flow within said fractionating column, within preselected setpoint limits.

* * * * *